3,034,224
ROTARY PRESSURE JOINTS AND ROTARY DRUM INTERNAL ASSEMBLIES

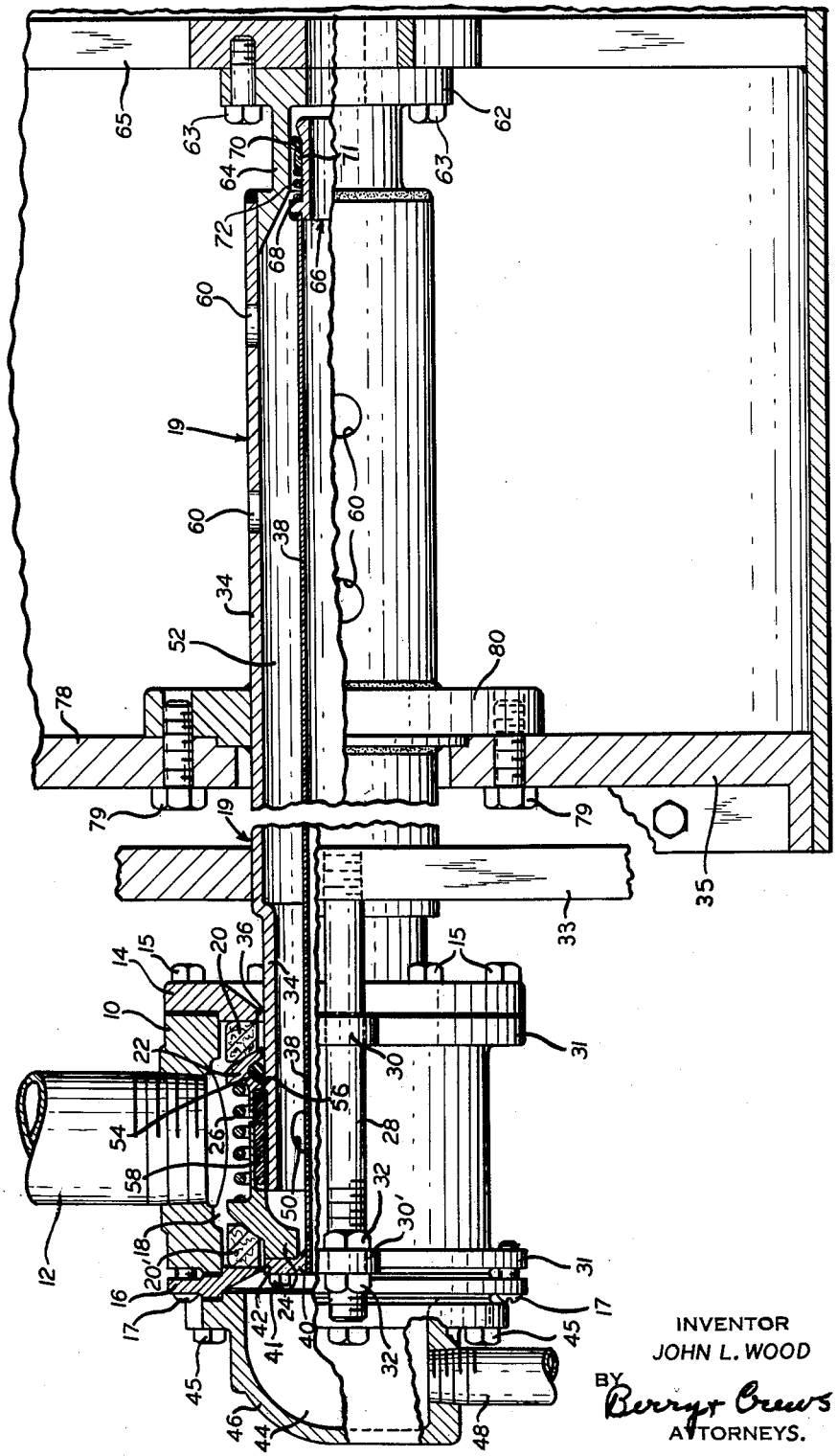

John L. Wood, Charleston Heights, S.C., assignor to West Virginia Pulp and Paper Company, New York, N.Y., a corporation of Delaware
Filed Aug. 13, 1958, Ser. No. 754,825
9 Claims. (Cl. 34—124)

This invention relates to improvements in rotary pressure joints and rotary drum internal assemblies of the type employed to conduct steam or other pressure fluid to a rotary drum, such as a dryer on a paper machine, and to conduct condensate or other pressure fluid away from the rotary drum. More particularly this invention relates to improvements in rotary pressure joints of the Johnson type as described, for example, in Patent No. 2,700,558.

A joint of the Johnson type comprises inner and outer pipes which penetrate, and turn in unison with, the drum to be heated. Steam is delivered to the drum through the annular space which is bounded externally by the outer pipe or shaft, and internally by the inner pipe. A non-rotary casing surrounds the shaft at the end remote from the drum. The casing defines a steam admission chamber, disposed in surrounding relation to the pipe ends, which communicates only with the annular space, and a condensate discharge chamber beyond the ends of the pipes, which communicates only with the inner pipe.

The casing is mounted upon stationary rods, which extend parallel to the pipes with freedom for bodily movement along the rods and relative to the pipes in the direction of the common axis of the pipes, but positively fixed against rotation about such axis. Provision is made of rings for sealing the steam admission chamber against escape of steam to the atmosphere and against escape of steam to the condensate discharge chamber, and of collars carried on the outer pipe for pressing against the respective sealing rings and holding them in firm engagement with opposite ends of the steam admission chamber.

In the conventional Johnson joint the collar nearer the drum is fixed on the outer pipe so that axial movement of the collar is positively prevented, but the collar more remote from the drum, through a key connection, is compelled to turn with the outer pipe but free to move axially therealong. A compression coil spring, interposed between the collars, and reacting against the fixed inner collar, urges the outer collar away from the fixed inner collar, and causes the outer collar to press the casing away from the drum.

The steam in the steam admission chamber surrounding the pipe assembly applies a balanced pressure to the outer and inner collars but the steam within the annular space applies a partially unbalanced pressure to the outer collar. Unbalanced forces within the condensate discharge chamber relieve the pressure on the outer sealing ring transmitted through the outer collar, but augment the force which urges the casing bodily away from the drum, so that a very substantial total force is developed in this action. This force is required to be sustained and fully balanced by the bodily fixed inner, less accessible ring and collar, the inner and less accessible ring being therefore subject to heavy pressure and rapid wear. Steam pressure within the annular space is largely balanced by condensate pressure in the condensate discharge chamber so far as the outer, and more accessible ring, is concerned, this ring being subjected only to the pressure of the spring plus the excess of steam pressure in the annular space over the pressure in the condensate chamber. The result is that the more accessible ring is subjected to substantial but moderate pressure and wear while the less accessible ring is subjected to severe pressure and wear.

In Patent No. 2,700,558 the heavy pressure on the inner ring is partially avoided by a steam diaphragm compensator. The present invention solves the problem more adequately and by simpler means.

In use with rotary dryers on high speed paper machines it has been found that joints of the above type are difficult to maintain. These maintenance difficulties arise partly from production methods necessary in economically operating a paper machine and partly from the design of these rotary pressure joints. In the operation of a paper machine it is necessary that all maintenance of rotary pressure joints be accomplished during a Fourdrinier wire change. Due to the large number of rotary pressure joints used on a paper machine, and the limited amount of time available to perform maintenance, it is highly desirable that rotary pressure joints be capable of operating for long periods of time without requiring maintenance and that when maintenance is required it be accomplished in a very short time.

When the sealing ring nearer to the rotary drum does wear out and must be replaced it is necessary to remove the entire rotary joint from the dryer. This is a very time consuming process and often it cannot be accomplished during a wire change.

In addition, the great load on the sealing ring nearer to the rotary drum causes a high amount of friction which necessitates the use of excessive power consumption in rotating the dryer.

The drum internal assemblies commonly used with the above type rotary joints have also been found to cause maintenance difficulties. These difficulties arise mainly from the use of a threaded disc for supporting the inner pipe from the outer pipe at the inner ends thereof, and for segregating the steam in the annular space from condensate leaving the drum. Any axial misalignment of the pipes causes stresses during rotation of the drum, and these result in frequent fractures occurring at the threads. To effect repairs of the drum internal assembly it is necessary to cool the drum and to enter the drum to remove the threaded disc. This is often complicated by corrosion of the threaded connections due to the action of steam and condensate.

A primary object of the present invention is to reduce the pressure on the inner ring, thereby to reduce the wear of the ring and to reduce the driving load on the motor.

A further primary object of the invention is to facilitate access to, repair of, and removal and replacement of, the inner ring, the inner pipe, and many associated internal parts of the organization.

To these ends, it is a feature that the casing is positively fixed against bodily movement relative to the outer pipe in the direction of the pipe axis, and that the inner collar, as well as the outer one, is keyed to the outer pipe for axial movement relative thereto. With this arrangement the pressure against the inner ring is only equal to the pressure of the spring plus any unbalanced pressure within the steam admission chamber applied over a very small area, while the pressure against the outer ring is the same as before; i.e., the pressure of the spring plus the unbalanced pressure within the steam admission chamber, plus the excess of steam pressure in the annular space over the opposing pressure of the condensate in the condensate chamber.

It is a further feature that the parts are so arranged that the mere detachment of a plate which carries the condensate extension exposes for inspection and possible repair or replacement the outer and inner sealing rings, the outer and inner keyed collars, the collar key, the inner pipe, and novel slip joint sealing means carried at the inner end of the inner pipe.

Other objects and advantages will hereinafter appear.

The single figure of the drawing forming part of this specification is a fragmentary side elevational view, partly in section, of an illustrative rotary pressure joint and drum internal assembly embodying features of this invention.

In the drawing a cylindrical casing member 10 having a connection 12 for the admission of steam, has end walls or plates 14 and 16 rigidly fastened to it by screws 15 and 17, respectively, to form a non-rotary casing which defines a steam admission chamber 18. The chamber 18 surrounds one end of a pipe assembly which is mounted for rotary motion. The chamber 18 is sealed against the escape of steam by the action of sealing rings 20, 20' in cooperation with end walls 14, 16 and collars 22, 24, mounted on the pipe assembly. The sealing rings 20, 20' and their respectively cooperating collars 22, 24 have spherical inter-engaging surfaces and are held in engagement with one another by the action of a compression coil spring 26 and the steam pressure in steam admission chamber 18.

Casing 10—14—16 is supported in fixed position by rods 28 which extend parallel to the pipe assembly 19 and pass through lugs 30, 30' formed on flanges 31 of the casing, being held in fixed position by nuts 32, 32. The inner ends of rods 28 are anchored in a stationary member 33 which desirably forms part of the supporting frame in which a rotary drum 35 is mounted, with freedom for rotation but not for axial movement. Two such rods, provided respectively on opposite sides of casing 10—14—16 serve with nuts 32, 32 firmly to hold the casing against movement axially of the pipe assembly 19.

The pipe assembly 19 comprises an outer pipe 34 which is rigidly fastened to the rotary drum 35. The pipe 34 extends through an opening 36 in end wall 14 with an all around clearance. The assembly 19 also includes an inner pipe 38, which is concentrically mounted within outer pipe 34, being anchored at one end in an annular plate 40 and the latter by means of screws 41 to the collar 24. The pipe 38 extends through annular plate 40 which is located within an opening 42 in the end wall 16, with an all around clearance. A condensate discharge chamber 44, formed by a casing 46 to receive condensate conducted by inner pipe 38 from the dryer, is connected to end plate 16 through lag screws 45. A conduit 48 communicates with casing 46, being provided as an outlet for condensate. Inner pipe 38 and outer pipe 34 define an annular flow passage 52. A passageway 50, in outer pipe 34, is provided to permit steam flow from steam admission chamber 18 into annular flow passage 52. Steam in chamber 18 and annular flow passage 52 is prevented from escaping between outer pipe 34 and collar 22 by an O-ring 54 which is contained within a groove 56 in the collar 22. Collars 22 and 24 are driven rotatively by, and in unison with, the outer pipe 34 by means of a key 58 but both are free to move longitudinally along outer pipe 34.

Outer pipe 34 and inner pipe 38 extend through an end wall 78 of the rotary drum 35, the outer pipe 34 being rigidly attached to the wall 78 through a collar 80. The collar 80 is welded to the pipe 34 and is secured to the wall 78 by screws 79. The pipes 34 and 38 extend into the drum 35 for substantial distances. Openings 60 are provided for the passage of steam from annular passage 52 into the interior of the rotary drum. A flange 62 having a neck 64 of smaller inside diameter than outer pipe 34 is provided for attachment to the pipe 34, and through screws 63 to a spider 65. A nipple 66 is attached at one end, as by welding, to inner pipe 38 and has a collar 68 adjacent one end thereof. The opposite end of the nipple 66 is flared slightly. An O-ring 70 is provided to prevent direct passage of steam from the annular space 52 into the pipe 38. The O-ring 70 is held in engagement with the inside surface of the neck 64 by crowding the O-ring toward the enlarged or flared end of the nipple 66. This is done by the action of a coil spring 72 which is seated on collar 68. The spring 72 acts through a slip collar 71 to thrust the O-ring into the narrowing space between the neck 64 and the flared of the nipple 66.

In operation of this joint steam is admitted to steam admission chamber 18 through connection 12 from an outside source. Being sealed from escape through openings 36 and 42 by sealing rings 20, 20' and O-ring 54 the steam passes through passage 50 into annular space 52. The steam is conducted through annular space 52 to the interior of the rotary drum and passes thereto through openings 60. Conventional means, not shown, are provided for causing condensate to be delivered from the drum to the interior of pipe 38, substantially to the exclusion of steam. Such condensate is conducted to condensate discharge chamber 44 and discharged through connection 48.

As the rotary drum rotates it turns outer pipe 34. Rotation is transmitted through key 58 to collar 28 and thence to inner pipe 38, causing the whole pipe assembly 19 and the drum internal assembly to rotate while the cylinder assembly 10, 14, 16, 46 is held stationary by the rods 28.

The unbalanced forces applied to the casing 10, 14, 16, 46 are absorbed by the stationary frame to which rods 28 are anchored. Since these unbalanced forces are not loaded on sealing ring 20, the life of the sealing ring is greatly increased. The removal of these forces from the sealing ring 20 greatly reduces the friction between the sealing ring and collar 22, so that a significant reduction in the amount of power required to operate the rotary pressure joint is realized.

Axial misalignment of outer pipe 34 and inner pipe 38 does not create a maintenance problem. As the ends of pipe 38 and pipe 34 located within the drum are, because of the elastic distortability of the O-ring 70, free to move slightly with respect to each other while a pressure seal between annular space 52 and the interior of pipe 38 is maintained, no strresses are set up to cause fracture.

All ordinary maintenance of the rotary pressure joint of this invention can be easily and rapidly performed. All parts of the rotary pressure joint can be removed and replaced with the exception of outer pipe 34, flange 62, plate 14, casing 10, without removing the joint from its fixed position.

After disconnecting pipe 48, or an extension thereof, end plate 16 with casing 46 attached can be removed, thus making sealing ring 20' accessible. Inner pipe 38 can then be withdrawn along with nipple 66, spring 72, collars 24, 22, coil spring 26, key 58 and O-ring 54. This permits removal of sealing ring 20.

The sealing action of O-rings 54 and 70 is effected by the action of pressure fluid forcing the O-ring into the opening through which the pressure fluid must flow to escape. Where a small pressure differential exists, such as between annular space 52 and the interior of inner pipe 38, a shallow angle of convergence between surfaces is desirable as on nipple 66 to insure a seal. Where a high pressure differential exists, as between steam admission chamber 18 and the atmosphere, a much steeper angle of convergence between surfaces is desirable.

During operation of the joint the inner surface of neck 64 becomes rough through the action of steam upon it. When withdrawing inner pipe 38 from the assembly, O-ring 70 often is prevented from sliding over the inner surface of neck 64 due to this roughness. It has been discovered that if the all around clearance between neck 64 and nipple 66 at the largest diameter of the nipple is approximately seventy percent or more of the diameter of O-ring 70, O-ring 70 will easily extrude past the end of the nipple when force is applied to withdraw inner pipe 38. The flare of nipple 66 is desirably maintained at an angle with the longitudinal axis of pipe 38 of less than 20°, both to insure a seal at the low pressure differential which exists, and to permit the extrusion of O-ring 70, through the opening between nipple 66 and neck 64 during withdrawal of the nipple.

The O-rings 70 and 54 are desirably made of "Teflon," tetrafluorethylene, or similar material, because of the ability of such material to withstand the temperatures of high pressure steam without any appreciable change in its physical characteristics.

While steam and water have been illustratively referred to as the fluids which are transmitted in and out through the rotary joint, it is to be understood the use with other fluids is contemplated as within the scope of the invention. The fluids may also be supplied to and from a heat utilizing instrumentality other than a drying drum, for example, a rotary digester, or to a rotary vessel of non-cylindrical form, for example, spherical. The direction of fluid could also be reversed.

I have described what I believe to be the best embodiments of my invention. I do not wish, however, to be confined to the embodiment shown, but what I desire to cover by Letters Patent is set forth in the appended claims.

I claim:

1. In a pressure fluid utilizing mechanism, the combination with a rotary drum of a rotary pressure joint assembly whose inner end extends into the drum axially, said assembly comprising radially spaced outer and inner pipes which define between them an annular space, the interior of the inner pipe and said annular space serving as separate channels for conducting fluid to and from the drum, said inner pipe being carried by and rotatable with the outer pipe, means affixing the outer pipe to the rotary drum for rotation therewith thereby fixing said outer pipe against axial movement, a generally cylindrical casing having a body portion and axially displaced end walls defining a first fluid transmission chamber disposed in surrounding relation to the outer end of the outer pipe, passage means between said chamber and the annular space to permit the flow of fluid therebetween, a second distinct, fluid transmission chamber beyond the outer end of the inner pipe, said chamber having an opening therein connecting with the interior of the inner pipe, means supporting said casing and positively securing it in fixed position so that it cannot move rotatively or axially in relation to the outer pipe, and sealing means within the casing defining the first fluid transmission chamber comprising axially spaced inner and outer sealing rings axially bearing against the axially displaced end walls of the chamber, axially spaced inner and outer sealing collars bearing against the respective sealing rings, both collars mounted with freedom for axial movement relative to the outer pipe and to one another, spring means disposed between the collars and acting against the collars for urging the collars away from one another and toward the respective rings, and key driving means constructed and arranged to cause the collars to be driven rotatably in unison with the outer pipe while leaving the collars free for axial movement toward the rings with which they are respectively associated.

2. In a pressure fluid utilizing mechanism, the combination with a rotary drum of a rotary pressure joint and drum internal assembly whose inner end extends in to the drum axially, said assembly comprising straight radially spaced outer and inner pipes defining between them an annular space for the delivery of fluid to the drum through the periphery of the inner end portion of the outer pipe, means carried by the outer and inner pipes and forming a resiliently deformable and slidingly separable sealing joint for said annular space at the inner ends of the inner and outer pipes, said joint being composed of radially spaced inner and outer concentric members whose facing surfaces converge toward their inner ends, a sealing ring surrounding the inner member, a spring on the inner member at the outer side of the sealing ring, and a collar on the inner member at the outer side of the spring for maintaining the spring compressed against the sealing ring and urging the sealing ring into contact with the converging facing surfaces of the inner and outer member, the interior of the inner pipe serving as a separate channel for conducting fluid away from the drum, a plural part casing comprising a section having a body portion and axially displaced end walls which define a fluid admission chamber in surrounding relation to the outer end of the outer pipe, and a section which defines a fluid discharge chamber having an opening therein connecting with the interior of the inner pipe, said chamber being located beyond the outer end of the inner pipe, means separably uniting said sections, means supporting the casing against rotation, passage means between the fluid admission chamber and the annular space, sealing means within said fluid admission chamber comprising axially spaced inner and outer sealing rings bearing against the axially displaced end walls, axially spaced inner and outer sealing collars bearing against the respective sealing rings, the latter ring at least being mounted with freedom for axial movement relative to the outer pipe, spring means disposed between the collars and acting against the collars for urging them away from one another, and key driving means constructed and arranged to drive the collars in unison with the outer pipe while leaving the outer collar, at least, free for axial movement, and means forming a sealing and supporting connection between the outer collar and the outer end of the inner pipe, the arrangement being such that the outer collar and the inner pipe can be pulled out at a unit directly upon separation of the casing sections.

3. In a pressure fluid utilizing mechanism, the combination with a rotary drum of a rotary pressure joint and drum internal assembly whose inner end extends into the drum axially, said assembly comprising straight radially spaced outer and inner pipes defining between them an annular space for the delivery of fluid to the drum through the periphery of an inner end portion of the outer pipe, the interior of the inner pipe serving as a separate channel for conducting fluid away from the drum, the outer pipe being fixed against axial movement, means forming a resiliently deformable and separable sealing joint for said annular space between the inner ends of said pipes so that the interior of the inner pipe is sealed against direct communication with the annular space, said joint being composed of radially spaced inner and outer concentric members whose facing surfaces converge toward their inner ends, a sealing ring surrounding the inner member, a spring on the inner member at the outer side of the sealing ring, and a collar on the inner member at the outer side of the spring means for maintaining the spring means compressed against the sealing ring and urging the sealing ring into contact with the converging facing surfaces of said inner and outer members, a plural part casing comprising a section having a body portion and axially displaced end walls which define a fluid admission chamber in surrounding relation to the outer end of the outer pipe and a section which defines a fluid discharge chamber having an opening therein connecting with the interior of the inner pipe, said chamber being located beyond the outer end of the inner pipe, passage means between the fluid admission chamber and the annular space, means supporting the casing and positively securing it against rotation, the casing so constructed that the outer end wall of the fluid admission chamber is located between said sections and removably attached to each, sealing means within said fluid admission chamber comprising axially spaced inner and outer sealing rings bearing against the axially displaced end walls, axially spaced inner and outer sealing collars bearing against the respective sealing rings and both mounted with freedom for axial movement, each away from the other and relative to the outer pipe, spring means disposed between the collars and acting against the collars for urging them away from one another and toward the respective rings, and key driving means constructed and arranged to cause the collars to be driven rotatively in unison with the outer pipe while leaving the collars free for axial movements toward the rings with which they are respectively associated, and means forming a sealing and supporting connection from the outer collar to the outer end of the inner pipe, said means being removably attached to the outer collar, the arrangement being such that upon removal of the fluid discharge section and detachment of the outer collar from the inner pipe, the inner pipe may be withdrawn while leaving the sealing means within the fluid admission chamber operatively confined therein by the outer end wall of the fluid admission chamber, but upon removal of said outer end wall, with or separately from the fluid discharge section, all the sealing means within the fluid admission chamber will be freed and made accessible for inspection or for direct withdrawal from said chamber.

4. In a pressure fluid utilizing mechanism, the combination with a rotary drum of a rotary pressure joint assembly whose inner end extends into the drum axially, said assembly comprising radially spaced outer and inner pipes defining between them an annular space for the delivery of fluid to the drum through the periphery of an inner portion of the outer pipe, the interior of the inner pipe serving as a separate channel for conducting fluid away from the drum, the outer pipe being fixed against axial movement, a plural part casing comprising a cylindrical section and axially displaced end walls which define a fluid admission chamber in surrounding relation to the outer end of the outer pipe, passage means between said chamber and the annular space to permit the flow of fluid therebetween, a separate section which defines a fluid discharge chamber beyond the outer end of the inner pipe, said chamber having an opening therein connecting with the interior of the inner pipe, and means separably uniting said sections, means supporting the casing against rotation, and sealing means within said fluid admission chamber comprising axially spaced inner and outer sealing rings axially bearing against the axially displaced end walls of the chamber, axially spaced inner and outer sealing collars bearing against the respective sealing rings, and both mounted with freedom for axial movement relative to the outer pipe, spring means disposed between the collars and acting against the collars for urging them away from one another and equally against the respective sealing rings, and key driving means constructed and arranged to cause the collars to be driven rotatively in unison with the outer pipe while leaving the collars free for axial movement, the section defining the fluid discharge chamber being directly and unobstructedly separable from the section defining the fluid admission chamber, and all the members of the sealing means within the fluid admission chamber being rendered accessible for inspection and freely, individually removable for repair or replacement upon mere removal of the fluid discharge chamber of the casing.

5. In a pressure fluid utilizing mechanism, the combination with a drum mounted with freedom of rotation but fixed against axial movement, of a rotary pressure joint and drum internal assembly whose inner end extends into the drum axially, said assembly comprising radially spaced outer and inner pipes having inner and outer axially spaced ends, the inner pipe being carried by and rotatable with the outer pipe, said pipes defining between them an annular space for the delivery of fluid to the drum through the periphery of an inner end portion of the outer pipe, the interior of the inner pipe serving as a separate channel for conducting fluid away from the drum, means affixing the outer pipe for rotation with the drum thereby fixing said pipe against axial movement, means carried by the outer and inner pipes and forming a resiliently distortable sealing joint between the inner ends of the pipes which is readily slidingly separable in response to a mere pulling out of the inner pipe, a plural part casing comprising a body and axially displaced end walls which define a fluid admission chamber having passage means connecting with the annular space, said chamber being in surrounding relation to the outer end of the outer pipe and means defining a fluid discharge chamber beyond the outer end of the inner pipe, said discharge chamber having an opening connecting with the interior of the inner pipe, means supporting the casing and positively securing it in fixed position so that it cannot move axially of the inner and outer pipes, sealing means within said fluid admission chamber comprising axially spaced inner and outer sealing rings axially bearing against the respective axially displaced end walls of the chamber, axially spaced inner and outer sealing collars bearing against the respective sealing rings and both mounted with freedom for axial movement, each away from the other and relative to the outer pipe, spring means disposed between the collars and acting against the collars for urging them away from one another and toward the respective rings, and key driving means constructed and arranged to cause the collars to be driven in unison with the outer pipe while leaving the collars free for axial movement each away from the other and relative to the outer pipe, the means defining the fluid discharge chamber being directly and unobstructedly separable from the fluid admission chamber, and all the sealing means within the fluid admission chamber being made accessible for inspection and directly slidably removable for repair or replacement upon detachment of the fluid discharge chamber.

6. In a pressure fluid utilizing mechanism, the combination with a rotary drum of a rotary pressure joint and drum internal assembly whose inner end extends into the drum axially, said assembly comprising straight radially spaced outer and inner pipes which define between them an annular space for the delivery of fluid to the drum through the periphery of an inner end portion of the outer pipe, means carried by the outer and inner pipes and forming a resiliently deformable, and directly separable seal between the inner ends of the pipes so that the interior of the inner pipe is sealed off from direct communication with the annular space, said means being composed of radially spaced inner and outer concentric members whose facing surfaces converge toward their inner ends, a sealing ring surrounding the inner member, a spring on the inner member at the outer side of the sealing ring, and a collar on the inner member at the outer side of the spring for maintaining the spring compressed against the sealing ring and urging the sealing ring into contact with the converging facing surfaces of the inner and outer members, the interior of the inner pipe serving as a separate channel for conducting fluid away from the drum, a plural part casing comprising a section having a body and axially displaced inner and outer end walls which define a fluid admission chamber in surrounding relation to the outer end of the outer pipe, passage means between said chamber and the annular space to permit the flow of fluid therebetween and a section which defines a fluid discharge chamber beyond the outer end of the inner pipe, said discharge chamber having an opening therein connecting to the interior of the inner pipe, said outer end wall of the fluid admission chamber disposed between said sections and detachably attached to each, means supporting the casing in fixed position so that it cannot move axially of the pipe assembly, sealing means confined within said fluid admission chamber by said outer end wall and comprising axially spaced inner and outer sealing rings axially bearing against the axially displaced end walls of the fluid admission chamber, axially spaced inner and outer sealing collars bearing against the respective sealing rings and both mounted with freedom for axial movement, each away from the other and relative to the outer pipe, spring means disposed between the collars and acting against the collars for urging them away from one another and toward the respective rings, and key driving means constructed and arranged to cause the collars to be driven rotatively in unison with the pipe assembly while leaving the collars free for axial movements toward the rings with which they are respectively associated, and means supporting the outer end of the inner pipe from the outer collar and sealing the space between them, said supporting means being detachably connected to the outer collar, the construction and arrangement being such that the inner pipe can be withdrawn independently of the last mentioned sealing means when the fluid discharge chamber is detached and withdrawn but the outer end wall of the fluid admission chamber is left in place, and the inner pipe and all elements of said last mentioned sealing means can be withdrawn when the outer end wall of the fluid admission chamber is detached.

7. In a pressure fluid utilizing mechanism, the combination with a rotary drum of a drum internal assembly whose inner end enters the drum axially, said assembly comprising straight radially spaced outer and inner pipes which define between them an annular space for the delivery of fluid to the drum through the periphery of an inner end portion of the outer pipe, the interior of the inner pipe serving as a separate channel for conducting fluid away from the drum, means supporting the inner end of the outer pipe from the drum and means carried by the outer and inner pipes and forming a resiliently deformable and separable sealing joint for said annular space at the inner end of the drum internal assembly, said sealing joint being composed of radially spaced inner and outer concentric members whose facing surfaces converge toward their inner ends, a sealing ring surrounding the inner member, a spring on the inner member at the outer side of the sealing ring, and a collar on the inner member at the outer side of the spring for maintaining the spring compressed against the sealing ring and urging the sealing ring into contact with the converging surfaces of the inner and outer members.

8. In a pressure fluid utilizing mechanism, the combination with a rotary drum of a drum internal assembly whose inner end enters the drum axially, said assembly comprising straight radially spaced outer and inner pipes which define between them an annular space for the delivery of fluid to the drum through the periphery of an inner end portion of the outer pipe, the interior of the inner pipe serving as a separate channel for conducting fluid away from the drum, means supporting the inner end of the outer pipe from the drum, and means forming a resiliently deformable and separable sealing joint for said annular space at the inner end of the drum internal assembly so that the interior of the inner pipe is sealed from direct communication with the annular space, said sealing joint comprising an outer tubular member forming a unitary part of the outer pipe and having a cylindrical bore, an inner tubular member forming a unitary part of the inner pipe and having an outstanding shoulder spaced axially outward from the inner end of said inner tubular member and a flaring portion at the extreme inner end of said tubular member, an O-ring disposed around the inner member, and a compression coil spring surrounding the inner member between the shoulder and the O-ring and urging the O-ring into the diminishing space between the outer member and the flared portion of the inner member, the construction and arrangement being such that the inner pipe can be directly removed by drawing it outward through the outer pipe, and that the O-ring, if seized by the external member in response to withdrawal of the inner pipe, can be readily extruded between the outer tubular member and the flared portion of the inner tubular member.

9. In a heat utilizing apparatus, the combination with a rotary heat utilizing vessel of a rotary pressure joint assembly whose inner end extends into the vessel axially, said assembly comprising radially spaced outer and inner pipes which define between them an annular space for the delivery of heating fluid to the vessel, the interior of the inner pipe serving as a separate channel for conducting spent fluid away from the vessel, the outer pipe being fixed against axial movement, the inner pipe being carried by and rotatable with the outer pipe, a casing having a body and axially displaced end walls defining a fluid admission chamber in surrounding relation to the outer end of the outer pipe, passage means between said chamber and the annular space, and a spent fluid discharge chamber beyond the outer end of the inner pipe, said last mentioned chamber having an opening therein connecting with the interior of the inner pipe, means supporting the casing and positively securing it in axially fixed relation to the outer pipe, sealing means within said fluid admission chamber comprising axially spaced inner and outer sealing rings bearing against the axially displaced end walls, axially spaced inner and outer sealing collars bearing against the respective sealing rings and each mounted with freedom for axial movement relative to the outer pipe, spring means disposed between the collars and acting against the collars for urging the collars away from one another and toward the respective rings, and key driving means constructed and arranged to cause the collars to be driven rotatively in unison with the pipe assembly while leaving the collars free for axial movements toward the rings with which they are respectively associated.

References Cited in the file of this patent

UNITED STATES PATENTS

| | | |
|---|---|---|
| 1,665,614 | Valentine | Apr. 10, 1928 |
| 2,477,762 | Monroe | Aug. 2, 1949 |
| 2,700,558 | Hieronymus | Jan. 25, 1955 |

FOREIGN PATENTS

| | | |
|---|---|---|
| 442,102 | Great Britain | Feb. 3, 1936 |

UNITED STATES PATENT OFFICE
CERTIFICATE OF CORRECTION

Patent No. 3,034,224

May 15, 1962

John L. Wood

It is hereby certified that error appears in the above numbered patent requiring correction and that the said Letters Patent should read as corrected below.

Column 4, line 19, for "28" read -- 24 --; column 6, line 29, for "at" read -- as --.

Signed and sealed this 4th day of September 1962.

(SEAL)
Attest:

ERNEST W. SWIDER
Attesting Officer

DAVID L. LADD
Commissioner of Patents